United States Patent Office 3,328,207
Patented June 27, 1967

3,328,207
RESIN TREATED FLEXIBLE BATTERY
SEPARATORS
Raymond D. Beaulieu, North Wilbraham, Mass., Frank
S. O'Connell, St. Louis, Mo., and Charles A. Magarian,
Wilbraham, Mass., assignors to Monsanto Company,
St. Louis, Mo., a corporation of Delaware
No Drawing. Filed Dec. 30, 1965, Ser. No. 517,791
4 Claims. (Cl. 136—146)

This invention relates to flexible cellulosic fibrous battery separators and to a process of preparing flexible cellulosic fibrous battery separators.

This application is a continuation-in-part of copending application Ser. No. 277,033, filed Apr. 30, 1963, and now abandoned.

Permeable cellulosic fibrous battery separators are used extensively in batteries of either the conventional "wet-charge" lead-acid type or the so-called "dry-charge" lead-acid type batteries. When employing these fibrous battery separators, it is necessary to protect the fibrous structure from attack by the battery acid. The cellulosic fibrous battery separators, therefore, are generally impregnated with a thermosetting type resin such as phenol-formaldehyde resin which resin when advanced to the thermoset state sufficiently protects the fibrous structure of the battery separator from attack by the battery acid.

However, when assembling the battery itself employing the phenol-formaldehyde impregnated fibrous battery separators, breaking or cracking of the battery separator is often encountered because of the brittleness of the battery separator due to the resin being advanced to the infusible state. The separators, therefore, require special handling and care when used in assembling batteries. In addition, it is conceivable that during the handling of the assembled batteries either in shipping or in actual use that breaking of the battery separators can also occur. If a battery separator cracks, so-called "lead treeing" occurs which will result in shorting adjacent negative and positive plates in one cell causing a "dead cell." This seriously shortens the useful life of the battery.

Therefore, it is an object of this invention to provide cellulosic fibrous battery separators having improved flexibility and resiliency.

It is another object of this invention to provide a process for preparing cellulosic fibrous battery separators having improved flexibility and resiliency.

Briefly, the above and other objects of this invention are attained by treating a permeable cellulosic fibrous sheet with a phenol-aldehyde thermosetting resin and a particular thermoplastic resin. The thermosetting resin and the thermoplastic resin are admixed before using to treat the cellulosic fibrous sheet.

The following examples are set forth to illustrate more clearly the principle and practice of this invention to those skilled in the art and are not to be construed as limitations on the invention. Unless otherwise stated, all parts and percentages are on a weight basis.

*Example I*

A one-stage water-dilutable phenol-formaldehyde resin is prepared by condensing 2.0 mols of formaldehyde per mol of phenol in the presence of a sodium hydroxide catalyst. The resin solids content of the prepared phenol-formaldehyde resin material is adjusted to 40% and admixed with an aqueous styrene-butadiene latex having about 48% solids to form a treating mixture containing about 42% solids consisting of 100 parts of the phenol-formaldehyde resin and 36 parts of the latex. The latex consists of about 60% styrene and 40% butadiene and is prepared by the emulsion polymerization of styrene monomer and butadiene monomer.

Permeable cellulosic fibrous sheets 6" x 6", are hand-dipped into the treating mixture. The treated samples are dried at room temperature for about 30 minutes. The samples are then cured in a circulating air oven at 170° C. for about 10 minutes and have a total solids pickup of 35% based on the weight of the untreated cellulosic fibrous sheets.

The cured samples are flexible and can be bent through a 180° arc without cracking.

*Example II*

Example I is repeated except that the resin solids content of the prepared phenol-formaldehyde resin is adjusted to 57%. Seventy-seven parts of the 57% solids resin material is then admixed with 23 parts of the styrene-butadiene latex resulting in a 55% solids admixture. To prevent coagulation of the latex when admixed with the phenol-formaldehyde resin, ammonium oleate and dodecyl benzene sodium sulfonate are added as stabilizers.

The flexibility of the samples so prepared is essentially the same as those in Example I.

*Example III*

Example I is repeated except that a latex of styrene-acrylonitrile having a solids content of 40% is employed herein in place of the styrene-butadiene latex of Example I.

The treated samples also have excellent flexibility and can be bent through an arc of at least 120° without cracking.

*Example IV*

Example I is repeated except that the resin solids content of the prepared phenol-formaldehyde resin is adjusted to 15% and admixed with an aqueous polystyrene latex having about 40% solids to form a treating mixture containing about 23% solids consisting of about 120 parts of the 15% solids resin material and about 63 parts of the latex. The polystyrene is prepared by the emulsion polymerization of styrene.

The flexibility of the samples is essentially the same as those in Example I.

*Example V*

Example I is again repeated with the exception that only the prepared phenol-formaldehyde resin adjusted to a solids content of about 40% is employed herein without the latex. The treated samples are air dried for about 30 minutes. The samples are also cured in an air-circulating oven at 170° C. for 10 minutes and have a resins solids pickup of 35% based on the weight of the untreated cellulosic fibrous sheet.

The flexibility of the samples which can now be used as battery separators is very poor in that they are brittle and crack upon bending through an arc of 45°.

This invention is directed to a flexible permeable cellulosic fibrous battery separator consisting of a permeable cellulosic fibrous sheet treated with a phenolaldehyde thermosetting resin and a thermoplastic resin, which phenol-aldehyde resin has been advanced to the infusible state. The combination of the phenol-aldehyde thermosetting resin and the thermoplastic resin provides not only protection for the cellulosic fibers of the battery separator from attack by the battery acid when so employed in a battery, but also imparts flexibility to the battery separator thereby greatly minimizing-breaking and cracking. The examples clearly show the extreme difference in flexibility between a battery separator consisting of a cellulosic fibrous sheet treated with the resin system of this invention and a battery separator consisting of a cellulosic fibrous sheet treated only with a phenol-aldehyde resin of the phenol-formaldehyde type thermosetting resin. In the first instance, the battery separator treated with the resin system of this invention can be bent through an arc of at least 120° without cracking and even greater depending upon the thermoplastic resin employed. On the other hand, battery separators treated with only a phenolformaldehyde type resin are very brittle and crack upon bending through an arc of only 45°. Therefore, as shown by the examples, it is this combination of the phenol-aldehyde thermosetting resin and the thermoplastic resin that provides for a flexible and acid resistant cellulosic battery separator.

In the practice of this invention any phenol-aldehyde resin may be employed herein. Particularly useful, however, are the phenol-formaldehyde resins which are generally prepared by the condensation reaction of about 0.5–3.0 mols of formaldehyde per mol of phenol in the presence of appropriate catalysts. The phenol-formaldehyde resins may be either a one-stage resin recovered in water, a one-stage resin recovered in a water-organic solvent or a liquid novolac two-stage resin having water associated with it. The preparation of these resins is generally well-known and the type of phenol-formaldehyde resin obtained depends upon the ratio of formaldehyde to phenol and the catalyst chosen for the reaction. As is well known in the art, the catalyst employed in the reaction may be either an acid or a basic type catalyst depending upon whether a one-stage or a two-stage resin is desired. The preferred phenol-aldehyde resin employed in the practice of this invention is a phenol-formaldehyde resin prepared by reacting 1.0–3.0 mols of formaldehyde per mol of phenol in the presence of an alkaline catalyst and wherein the reaction product is recovered in water. The phenol-formaldehyde resin employed in the practice of this invention should have a water tolerance of 0.1 volume of water per one volume of resin to greater than 50 volumes of water per one volume of resin. However, as a practical limit, the water tolerance should be at least 5 volumes of water per one volume of resin.

Typical examples of other phenol-aldehyde resins which can be employed in place of those set forth in the examples are resorcinol formaldehyde, catechol formaldehyde, phenol acetaldehyde and alkylated phenol-formaldehyde resins having an alkyl group containing 1–3 carbon atoms such as xylonol formaldehyde, etc.

The thermoplastic resin employed herein is a thermoplastic styrene polymer which can be prepared by an emulsion polymerization process to form an aqueous latex. In the practice of this invention, the thermoplastic styrene polymer can, therefore, be any of the homopolymers or interpolymers of styrene which can be prepared by the emulsion polymerization process. The interpolymers of styrene employed should be those interpolymers which do not contain any carboxyl groups and should contain at least 25 weight percent, preferably, 50 weight percent and more particularly 75 weight percent of styrene with the balance being, correspondingly, up to 75 weight percent and, preferably, up to 50 weight percent and more particularly up to 25 weight percent of any monomeric compound which is not an acid monomer and which will interpolymerize with styrene, particularly those monomeric compounds having the vinylidene group

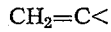
$$CH_2=C<$$

These monomeric materials include such compounds as mono-olefins and diolefins, e.g., ethylene, propylene, isobutylene, butadiene, isoprene, acrylamide, methacrylamide, methacrylonitrile, acrylonitrile; acrylic and methacrylic acid esters of alcohols containing 1–18 carbon atoms such as methyl and ethyl methacrylate; other vinylidene aromatic compounds, e.g., alphamethylstyrene, vinyl toluene, p-ethylstyrene, 2,4-dimethylstyrene, chlorostyrene, 2,5-dichlorostyrene, vinyl naphthalene; etc. Other monomers which can be interpolymerized with styrene for the purposes of the present invention include diethyl maleate, dibutyl fumarate, etc. It may be feasible and desirable to employ blends of two or more such thermoplastic styrene polymers. The preferred thermoplastic resin to be employed in the practice of this invention is the copolymer of styrene and butadiene. Preferably the copolymer should contain at least 60 weight percent of styrene and, correspondingly, up to 40 weight percent of butadiene.

When employing the resin system of this invention, the essential feature is that sufficient resin should be deposited onto the fibers of a permeable cellulosic fibrous sheet when preparing battery separators so as to impart flexibility and acid resistance to the battery separators. As a practical matter, the amount of total resin pickup should be 10–60 weight percent and, preferably, 20–40 weight percent of the resin solids based on the weight of the untreated cellulosic fibrous sheet. The cellulosic fibrous sheet employed in preparing battery separators in accordance with this invention is treated with an admixture of the phenol-aldehyde resin and the thermoplastic resin. The proportionate parts of the total resin solids deposited on the sheets should constitute on a weight basis 20–95 parts and, preferably, 60–95 parts of the phenol-aldehyde resin and, correspondingly, 80–5 parts and, preferably, 40–5 parts of the thermoplastic resin.

It should be noted that when employing a high solids resin composition wherein the phenol-aldehyde thermosetting resin and the thermoplastic resin are admixed together, it may be necessary to employ stabilizers. These stabilizers, which are added to the thermoplastic resin, prevent coagulating of the thermoplastic resin when admixed with the phenol-aldehyde resin. Generally, when the composition of the resin has a solids content of below 45 weight percent, stabilizers may not be necessary. When the resin composition has a solids content of greater than 45 weight percent, stabilizers are necessary in order to prevent coagulation of the resin. Any of the known stabilizers may be employed and include such compounds as ammonium oleate, sodium oleate, potassium oleate, ammonium palmitate, sodium palmitate, potassium palmitate, dodecyl benzene sodium sulfonate, sulfonated polyoxyethylene ethanols, etc.

In the process of preparing battery separators from a cellulosic fibrous sheet, the resin treated cellulosic sheet is subsequently dried to remove any excess water or other solvent that may be present. The treated cellulosic sheet is generally dried at room temperature for approximately 30 minutes. However, higher temperatures may be employed to speed up the drying of the treated cellulosic sheet. Caution should be noted though when employing elevated temperatures in that only the excess water or other solvent is removed. The treated cellulosic sheet is then subjected to a temperature of from about 200° F. to about 600° F. in order to advance the phenol-aldehyde resin to an infusible state. The time of exposure to the higher temperatures will vary depending upon the temperature employed. For example, the treated celulosic sheet may be subjected to a temperature of 200° C. for approximately 30 minutes or it may be subjected to a temperature of as high as 600° F. for at least one minute. In addition, the cellulosic fibrous battery separator is generally ribbed to increase its resistance to degradation during use thereof in a lead-acid battery.

Although the preferred battery separator employed in the practice of this invention is a cellulosic fibrous structure having a Gurley air-permeable viscosity of about 1–25 seconds when using a 5 oz. cylinder and a ¼ sq. in. orifice, other battery separator structures may be prepared by incorporating the resins of this invention. For example, the resins employed in this invention may be used to bind and coat battery separators prepared from glass fibers or diatomaceous earth or combinations of both with or without cellulosic fibers.

The advantages of this invention are found in that the cellulosic battery separator treated with the compositions herein have good flexibility in comparison to a battery separator treated only with a phenol-aldehyde type thermosetting resin. This greatly enhances the ease of handling of the treated battery separator and reduces cracking thereof.

It will thus be seen that the objects set forth above among those made apparent from the description are efficiently attained and since changes may be made in carrying out the above process and in the compositions set forth without departing from the scope of this invention, it is intended that all matters contained from the above description shall be interpreted as illustrative and not in a limiting sense.

What is claimed is:

1. A flexible permeable cellulosic fibrous battery separator wherein the cellulosic fibers have deposited thereon 10–60 weight percent based on the weight of the untreated cellulosic fibers of a resin composition comprising in admixture 20–95 parts of a phenol-aldehyde resin and 80–5 parts of a thermoplastic resin which thermoplastic resin is selected from the group consisting of homopolymers and interpolymers of styrene wherein the interpolymers contain at least 25 weight percent of styrene with the balance being any monomeric compound which will interpolymerize with styrene and which interpolymers do not contain any carboxyl groups. said parts of resins being based on the total resin solids of the composition.

2. The battery separator of claim 1 wherein the phenol-aldehyde resin is the condensation product of 1.0–3.0 mols of formaldehyde per mol of phenol.

3. The battery separator of claim 1 wherein the thermoplastic resin is a copolymer of styrene and butadiene.

4. The battery separator of claim 1 wherein the thermoplastic resin is a copolymer of styrene and acrylonitrile.

References Cited

UNITED STATES PATENTS

| 2,707,201 | 4/1955 | Fernald et al. | 136—146 |
| 2,810,775 | 10/1957 | Raphael et al. | 136—146 |
| 3,019,134 | 1/1962 | Hechtman | 162—165 |
| 3,239,381 | 3/1966 | O'Connell | 162—165 |

FOREIGN PATENTS

| 722,804 | 2/1955 | Great Britain. |

WILLIAM H. SHORT, *Primary Examiner.*

E. M. WOODBERRY, *Assistant Examiner.*